United States Patent [19]

Peacock

[11] Patent Number: 5,361,528
[45] Date of Patent: Nov. 8, 1994

[54] TRAWLING SYSTEM AND TRAWL DEVICE FOR SHRIMP

[76] Inventor: Francis E. N. Peacock, 100 Waterford Pl., Alexandria, Va. 22314

[21] Appl. No.: 66,230

[22] Filed: May 25, 1993

[51] Int. Cl.$^5$ .............................................. A01K 73/02
[52] U.S. Cl. ........................................ 43/6.5; 43/9.1; 43/9.4
[58] Field of Search ................ 43/9.1, 9.2, 9.3, 9.4, 43/6.5

[56] References Cited

U.S. PATENT DOCUMENTS

| | | | |
|---|---|---|---|
| 1,388,414 | 8/1921 | Dros | 43/6.5 |
| 1,447,553 | 3/1923 | Hudson | 43/6.5 |
| 1,745,251 | 1/1930 | Enright | 43/6.5 |
| 2,300,178 | 10/1942 | Ross | 43/9.4 |
| 2,523,925 | 9/1950 | Sorensen | 43/9.1 |
| 2,608,782 | 9/1952 | Bottemanne | 43/9.1 |
| 3,195,261 | 7/1965 | Luketa | 43/6.5 |
| 3,440,752 | 4/1969 | Minter | 43/6.5 |
| 3,548,531 | 12/1970 | Holden | 43/9.1 |
| 3,608,217 | 9/1971 | Voisin, Sr. | 43/9.4 |
| 4,224,755 | 9/1980 | Bourret | 43/9.1 |

FOREIGN PATENT DOCUMENTS

2534776  4/1984  France.

Primary Examiner—Kurt C. Rowan
Attorney, Agent, or Firm—Dalton L. Truluck

[57] ABSTRACT

A trawling system for catching shrimp which includes a trawler, an outrigger carried by the trawler, an onboard suction pump, a trawl device that is adapted to be dragged along the bottom of a body of water behind the trawler, and a conduit connected from the onboard suction pump to a suction pocket of a net forming part of the trawl device for continuously delivering shrimp from the trawl device to the trawler. The trawl device includes two elongated trawl beams which are joined together at adjacent ends by a hinge connection to form an angle. Each trawl beam is composed of at least a pair of spaced-apart end strut plates, rods extending between the strut plates, a depressor hydrofoil beam for urging the entire trawl device toward the seabed as it is towed through the water, a net which has a suction pocket for collecting shrimp, skids for sliding on the seabed, and an open space adjacent the suction pocket of the net for allowing non-targeted species to escape.

40 Claims, 3 Drawing Sheets

TRAWLING SYSTEM AND TRAWL DEVICE FOR SHRIMP

FIELD OF THE INVENTION

The present invention relates to a trawling system and trawl device for general use by the fishing industry, but especially for catching shrimp. More particularly, the present invention is directed to a complete trawling system which includes a trawler supplied with conventional shrimping gear, an outrigger carried by the trawler, an onboard winch, an onboard suction pump, a novel trawl device which is adapted to be dragged along the bottom of a body of water behind the trawler to collect shrimp, and a conduit connected from the suction pump to a suction pocket of a net of the trawl device for continuously delivering live shrimp from the trawl device to the trawler.

BACKGROUND OF THE INVENTION

The United States shrimp fishing industry is facing serious economic and environmental problems. Rising costs of shrimp caught by shrimp fishers is making it difficult for this industry to compete with imported shrimp, most of which is raised in ponds. Also, increasing environmental regulations, especially those aimed at reducing the mortality of non-targeted species, is negatively affecting the shrimping industry. The environmental problem relating to non-targeted species arises from the large quantities of non-targeted species of fin fish, as well as turtles, which are caught together with shrimp when using presently available trawling apparatus and often returned dead to the sea. Much of this catch, termed bycatch, is made up of juveniles of commercially valuable species, which are thus wasted. Regulatory actions to reduce this waste problem are rapidly increasing.

Most shrimp are caught by otter trawls towed behind trawlers. The otter trawl was introduced to the shrimp fishing industry in 1912 and has undergone few changes since its inception. Basically, the otter trawl is a large funnel made of mesh netting. Extending from the mouth of the funnel are two mesh extensions, one on either side, that are designed to guide shrimp into the mouth of the net. At the narrow rear end of the net is located the collecting bag, called a codend.

Although the otter trawl was a dramatic advancement to the shrimp fishing industry, nevertheless it has always been troubled with numerous disadvantages: for example, high drag, which increases fuel consumption of the trawler as well as limits towing speed, with the consequent reduction in the amount of area which can be covered per unit of time; difficulty in maintaining the net on the sea bottom at higher speeds (which can be partially corrected by using heavier otter doors, but at the expense of increased drag); the necessity for periodically hauling in the net, emptying it, and recasting it; the need to employ a separate net to determine the presence or absence of shrimp in the water through which the otter net is being drawn; the liability of shrimp and non-targeted species being dead when hauled in; and the difficulty for non-targeted species (bycatch) to escape. As to this last shortcoming, a great effort has been made to solve this problem through the inclusion of turtle exclusion devices (TED) and bycatch reduction devices (BRD), but limited success has been attained. At present, even the most sophisticated otter trawl still suffers from the aforementioned deficiencies because of the inherent limitations of its basic concept.

The solution, then, is to provide a new trawling system and trawl device which will catch more shrimp and kill less bycatch, thus resulting in cost economies and reducing the negative impact on the environment.

DISCUSSION OF THE PRIOR ART

Numerous attempts have been made to provide an efficient and effective trawling system and trawl device for use by the fishing industry. To date, however, no fully successful system or device has been developed.

The following patents represent the closest prior art relating to the instant invention which is known to the inventor:

| Dros | 1,388,414 | August 23, 1921 |
| Hudson | 1,447,553 | March 6, 1923 |
| Sorensen | 2,523,925 | September 26, 1950 |
| Bottemanne | 2,608,782 | September 2, 1952 |
| Luketa | 3,195,261 | July 20, 1965 |
| Jego (France) | 2,534,776 | April 27, 1984 |

The Dros and Hudson patents are the most closely related known trawling systems to the overall trawling system of the present invention. Both of these systems employ a trawl towed by a trawler and connected to the trawler by a conduit which serves to transport live catch continuously to the trawler. However, unlike the present invention, the trawl of both Dros and Hudson is a conventional otter trawl and thus has the inherent disadvantages discussed above with respect to otter trawls.

The patents to Sorensen, Bottemanne, Luketa and Jego (French patent) all disclose trawl devices which bear some resemblance to the trawl device of the present invention but which, nevertheless, still possess most of the disadvantages mentioned above in the discussion of otter trawls.

More specifically, similarly to the present invention, Sorensen teaches the use of a hydrofoil member to urge a trawl toward the seabed. However, as with the Dros and Hudson patents, again the trawl is a conventional otter trawl and thus has such disadvantages as high drag, the need to haul onboard for emptying, and the inability of permitting bycatch to escape, all as discussed above.

Bottemanne likewise is directed to an otter trawl and has only been listed for its disclosure of the unfolding wings at the front of the net for increasing catching capacity. The hingedly connected together trawl beams of the trawl device of the instant invention can by folded and unfolded, but their purpose and function is entirely different from the wings on the otter trawl of Bottemanne.

Luketa shows a trawl net having a spiller to permit excess fish within the net to escape after the codend has become filled, thereby minimizing damage of the fish and preventing overloading of the net. Once again, however, the trawl net is an ordinary otter trawl.

Jego discloses a trawl device for fishing for fin fish, crustaceans (e.g. shrimp) or mollusks. Similarly to the present invention, the trawl device of Jego employs a trawl beam with a hydrofoil beam to force the trawl device toward the sea bottom, and skids to maintain the hydrofoil beam a predetermined distance off the sea bottom. One or more of the trawl beams may be utilized; but when two or more are used, they are connected together in a straight line, i.e. 180 degrees. Consequently, unlike the present invention, the trawl beams are towed at right angles to the water flow and the catch is collected in the net of the trawl device. In addition, the trawl device of Jego lacks a bottom rod to scare up shrimp; and the top edge of the net is directly attached to the trailing edge of the hydrofoil beam, with the result that all shrimp must enter the net from underneath the hydrofoil beam. Further, the system of Jego is devoid of a conduit for continuously delivering shrimp to the trawler.

OBJECTS AND SUMMARY OF THE INVENTION

It is a paramount object of this invention to provide a low drag trawl device for use in catching shrimp that can be towed on the seabed, or bottom of any body of water, at high speed, thereby increasing the potential for larger quantities of shrimp to be caught per unit of time.

Another major object of this invention is to reduce the quantity of non-targeted species captured by maintaining the vertical dimension or height of the mouth opening of the trawl device to the minimum required for effective gathering of shrimp and by providing for easy escapement of the non-targeted species.

Still another principal object of the present invention is to minimize the mortality of non-targeted species by continuously delivering both unharmed shrimp and unharmed non-targeted species through a conduit extending from a suction pocket of the net to the trawler so that the unharmed non-targeted species immediately can be separated from the shrimp and returned live to the sea.

Yet another object of the present invention is to include in conjunction with the delivery conduit all necessary hardware for permitting the conduit to be flushed out if it becomes blocked without having to retrieve the trawl device onto the trawler in order to unclog it.

A further object of the invention is to enable the crew onboard the trawler to monitor continuously the quantity of shrimp delivered onboard from the net so that they can respond immediately to variations in shrimp abundance in the area.

Additional objects of the invention are to reduce the crew's workload and optimize their revenue.

Expressed simply, the overall object of this invention is to introduce a more profitable and environmentally friendly method of catching shrimp than presently exists.

These and other objects are accomplished by the trawling system and trawl device constructed as summarized next below.

Briefly, the trawling system of the invention comprises a trawler, an outrigger carried by the trawler, an onboard winch, an onboard suction pump, a novel trawl device which is adapted to be dragged along the bottom of a body of water behind the trawler, and a conduit connected from the suction pump to a suction pocket of a net of the trawl device for continuously delivering live shrimp, as well as any non-targeted species unavoidably captured along with the shrimp, from the trawl device to the trawler. The trawler also includes a conduit reel, a separator, receiving tanks, and other such conventional apparatus customarily found on shrimp trawlers.

The novel trawl device includes two trawl beams which are joined together at adjacent ends by a hinge piece that allows them to rotate freely in the same plane as the major cross-sectional axes of the hydrofoil beams described later. Each trawl beam is composed of a pair of upstanding end strut plates, an optional intermediate upstanding strut plate or several optional intermediate upstanding strut plates, depending on the overall length of the trawl beam, several parallel rods extending between the two end strut plates and passing through any intermediate strut plate, a depressor hydrofoil beam also extending between the two end strut plates as well as any intermediate strut plate, a net which includes a suction pocket defined by a portion of the net together with a funnel attached to the net, and skids for sliding along the sea bottom and keeping the depressor hydrofoil beam at a predetermined distance off the sea bottom. The shape of each depressor hydrofoil beam is designed to generate a downward force when the trawl beam is pulled forward in the water by a tow cable extending from the trawler to a towing eye affixed to the hinge piece. The spread angle formed at the center by the two joined-together trawl beams can be adjusted mechanically to any value by any positive action mechanism, the setting of the spread angle determining the distance between the outer ends of the trawl beams and therefore the effective width or spread of the trawl device. However, spread angle settings in the vicinity of 180 degrees should be avoided because, although maximizing the effective width, they also maximize drag and, further, annul the force of water flowing at an angle through the nets, which is necessary to move shrimp in the direction of the suction pockets.

In operation, conduits, i.e. hoses, are connected from the suction pump onboard the trawler to the funnels of the suction pockets of the nets. As the trawl device is towed through the water along the seabed, shrimp impinge upon the nets and are moved by water flowing at an angle to the nets into the suction pockets, which are positioned to intercept their path, whereat they are drawn into the funnels and thence into the conduits by suction created by the pump, arriving finally onboard.

Ordinarily, two trawl devices, one on each side of the trawler, would be towed simultaneously from outriggers of the trawler, but such is not essential to the trawling system. If desired, only a single trawl device may be towed; and such single trawl device may be made any size.

BRIEF DESCRIPTION OF THE DRAWINGS

The invention is illustrated by way of example in the accompanying figures in which.

DETAILED DESCRIPTION OF THE INVENTION

The overall trawling system of this invention may take on several forms, each form differing fundamentally only in the number and sizes of the trawl devices towed behind the trawler, as well as their respective spread angles as viewed from the trawler. As examples, the trawling system may employ a single large trawl device towed centrally behind the trawler, or two equal-sized trawl devices towed behind the trawler, one to each side thereof. As to the spread angle of an individual trawl device, such can be any value larger or smaller than 180 degrees. Still other arrangements are possible, the choice being dictated by preference of the shrimping crew and the conditions and nature of the locale where shrimping is taking place.

Figures 1, 2:
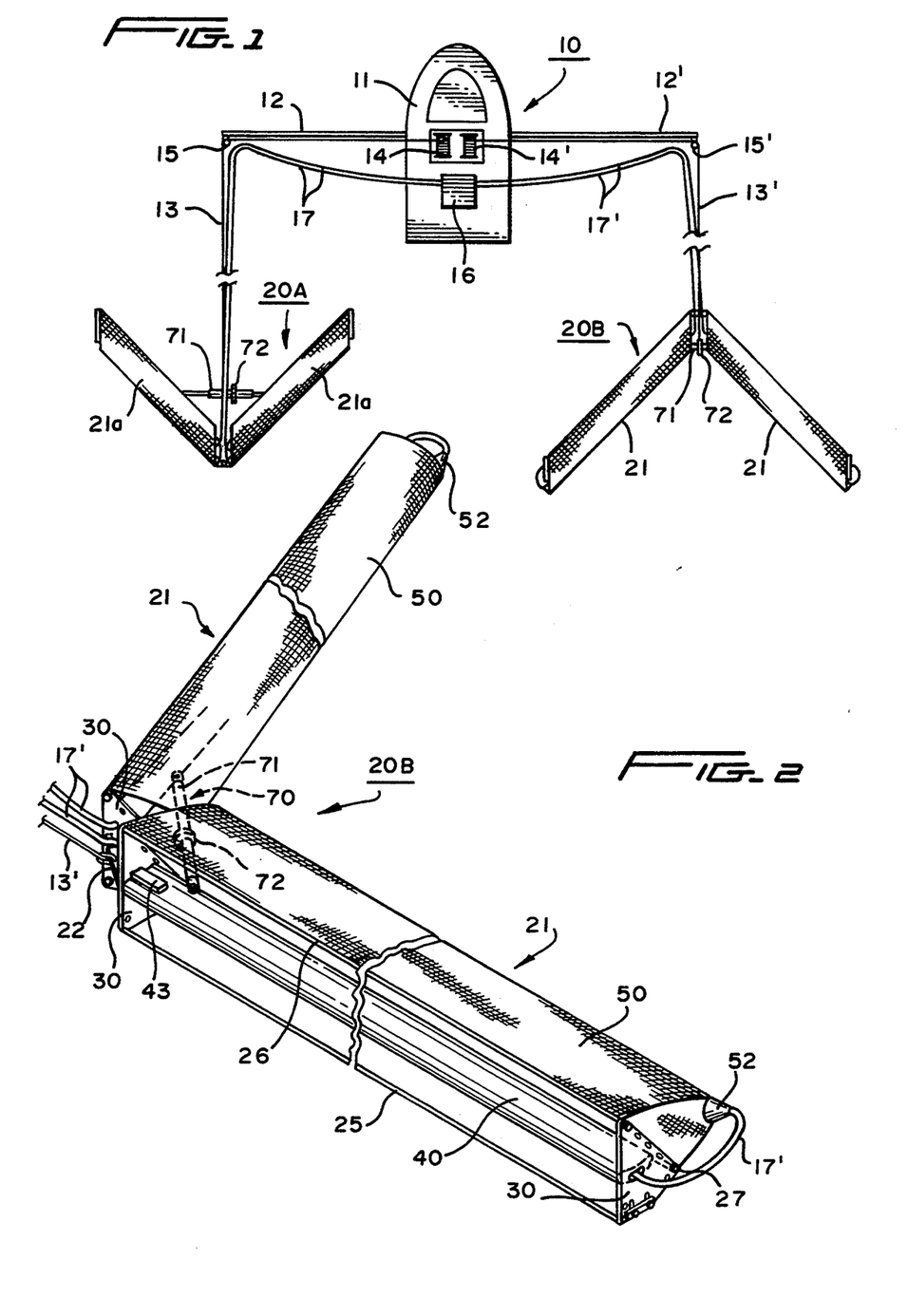
FIG. 1 is a top plan view depicting one general arrangement of the entire trawling system.
FIG. 2 is a perspective view of a trawl device composed of two trawl beams hingedly connected together and having suction pockets at their remote ends.

Referring now to FIG. 1 of the accompanying drawings, there one typical arrangement of the overall trawling system in accordance with the invention is shown. This arrangement is the sort employing two equal-sized trawl devices towed behind the trawler, and is indicated in its entirety by the reference numeral 10. As shown, the trawling system 10 comprises a conventional shrimp trawler 11 equipped with outriggers 12, 12', tow lines or cables 13, 13' extending from onboard winches 14, 14' around sheaves 15, 15' on the outriggers to two trawl devices 20A, 20B, an onboard suction pump 16, and conduits or hoses 17, 17' extending from the trawl devices 20A, 20B to the suction pump 16, the conduits and suction pump together constituting means for transporting or conveying sea catch to the trawler. For convenience only, two different styles of trawl devices have been depicted in FIG. 1: namely, a trawl device 20A having two trawl beams joined together such that they form an angle less than 180 degrees as viewed from the trawler, each trawl beam including a suction pocket at the end thereof which is joined to the other trawl beam; and a trawl device 20B having two trawl beams joined together such that they form an angle greater than 180 degrees as viewed from the trawler, each trawl beam including a suction pocket at the end thereof which is remote from the joined ends. It is to be understood, however, that normally, indeed preferably, both trawl devices in the system of FIG. 1 will be of the same style; that is, two trawl devices 20A will be used, or two trawl devices 20B will be used.

Turning now to FIG. 2, there is shown in greater detail a trawl device of the variety 20B illustrated in FIG. 1. The trawl device 20B is composed of two trawl beams 21, 21 joined together by a hinge piece 22. The two trawl beams 21, 21 are set and maintained at an angle with respect to each other by means of a spreader mechanism 70 composed of a turnbuckle 71 having a chain wheel adjusting element 72. The details of a trawl beam 21 can be seen more clearly from FIGS. 3-5, 7 and 8, to which reference is next made along with FIG. 2.

Figures 3, 4, 5:
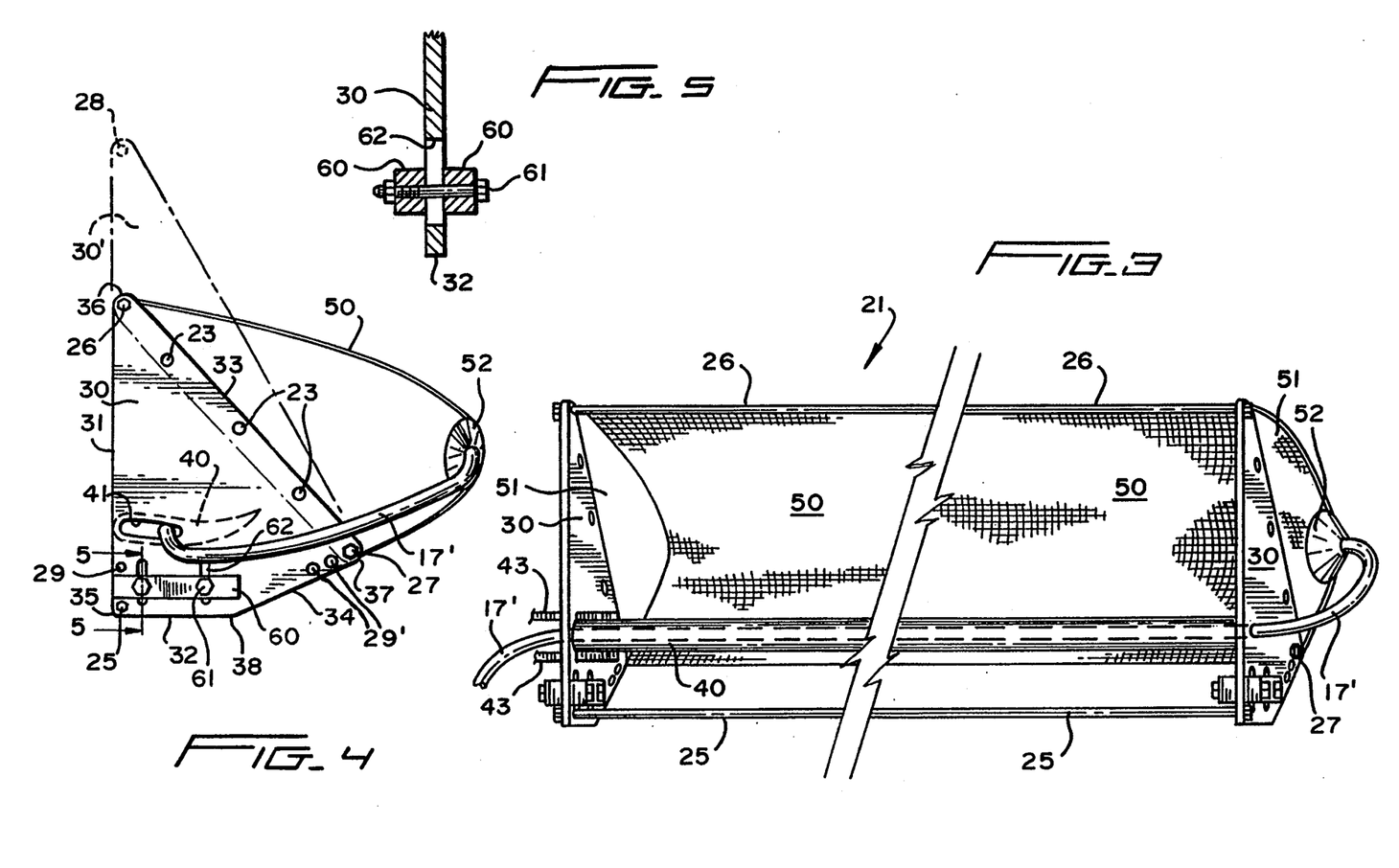
FIG. 3 is a front view of a single trawl beam.
FIG. 4 is an end view of a single trawl beam as viewed from the right-hand side of FIG. 3.
FIG. 5 is a cross-sectional view, taken along the line 5—5 of FIG. 4 in the direction of the arrows, of the skids employed on the strut plates.

As shown in FIGS. 3 and 4, trawl beam 21 is a frame structure formed of at least a pair of upstanding end strut plates 30, 30 and a series of parallel rods 25, 26 and 27 extending therebetween. Depending on the desired overall length of the trawl beam, one or more intermediate strut plates identical to strut plates 30 may be provided between the two end strut plates. The rods 25, 26 and 27 will pass through any such intermediate strut plates. Each strut plate 30 is of identical shape and has four edges: a forward or leading edge 31, a bottom edge 32 meeting the leading edge 31 at an approximately right angle lower leading corner 35, and two rear edges 33 and 34 conjointly defining a trailing edge. Rear edge 33 joins leading edge 31 at an acute angle upper leading corner 36; rear edge 34 joins bottom edge 32 at an obtuse angle corner 38; and rear edges 33 and 34 meet each other at an acute angle trailing corner 37. Rod 25 extends between strut plates 30, 30 at lower leading corners 35, 35; rod 26 extends between strut plates 30, 30 at upper leading corners 36, 36; and rod 27 extends between strut plates 30, 30 at trailing corners 37, 37. In use, the rod 25 at the lower front will contact the seabed to scare up shrimp. Hence, the bottom rod constitutes a means for scaring up shrimp from the sea bottom or seabed. On the other hand, by virtue of the obtuse angle formed between the bottom edge 32 and the rear edge 34, the rear rod 27 will always be maintained out of contact with the seabed. As a result, a space exists beneath the rods 25 and 27 through which neutrally buoyant objects such as shrimp can pass from underneath into the net 50, while heavier objects such as seashells will pass under rod 27 and stay out of the net.

Figure 8:
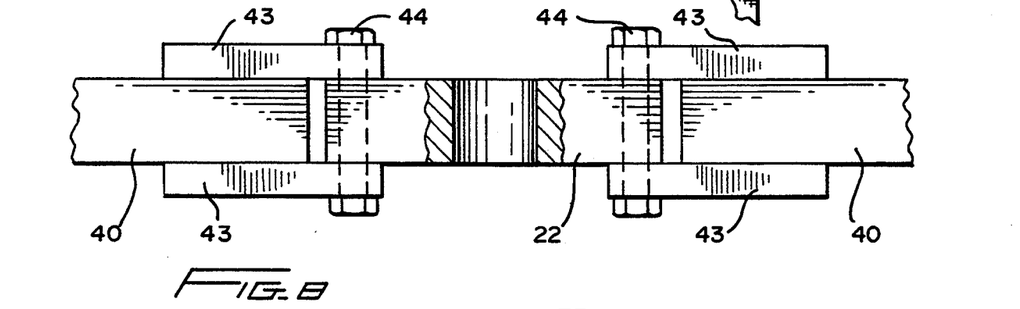
FIG. 8 is a frontal detail view of a hinge piece and hinge pins used for joining two trawl beams together.

The end strut plates 30, 30 and any intermediate strut plates are rigidly fastened together by a depressor hydrofoil beam 40. The hydrofoil beam is preferably fabricated from aluminum by extrusion, but other suitable materials and fabrication techniques can be utilized. Preferably, the hydrofoil beam is attached to the strut plates by welding, but, again, other modes of fastening can be employed. The hydrofoil beam has a passageway 41 extending from end to end for a purpose which is later set forth. The strut plates are formed with apertures which communicate with the passageway 41 in the hydrofoil beam, as shown in FIG. 4. To each end of the hydrofoil beam are attached upper and lower plates 43 which terminate in free ends that are apertured for receiving hinge pins 44 for connecting the hinge piece 22, all as shown in FIG. 8.

The hydrofoil beam is located between the upper and lower rods 26 and 25, respectively. Open spaces therefore exist between the upper rod 26 and the hydrofoil beam 40 and between the lower rod 25 and the hydrofoil beam 40. In use, shrimp can pass through these spaces in addition to passing through the space between rods 25 and 27.

The depressor hydrofoil beam is a very significant and important feature of the present invention because it functions as a means for forcing the trawl device toward the seabed so as to keep the trawl device continuously on the seabed as it is being dragged behind the trawler. This is accomplished by designing the depressor hydrofoil beam with inverted hydrofoil surfaces. More particularly, the depressor hydrofoil beam is profiled to have a concave top surface and a pronounced convex bottom surface that will accelerate water flowing under the hydrofoil beam and create a low pressure zone that extends the full length of the hydrofoil beam. The pressure differential thus created between the top and bottom surfaces of the hydrofoil beam when towed through the water will produce downward hydrodynamic forces which force the hydrofoil beam downwardly, yet allow the trawl device to be towed at high speed without losing contact with the seabed or significantly increasing drag. Of equal importance, the low pressure zone also serves to suck up buried shrimp, which tend to jump up when contacted by the bottom rod 25 and are then swept into the net by the upward flow of water under hydrofoil beam 40.

Figures 6, 7:
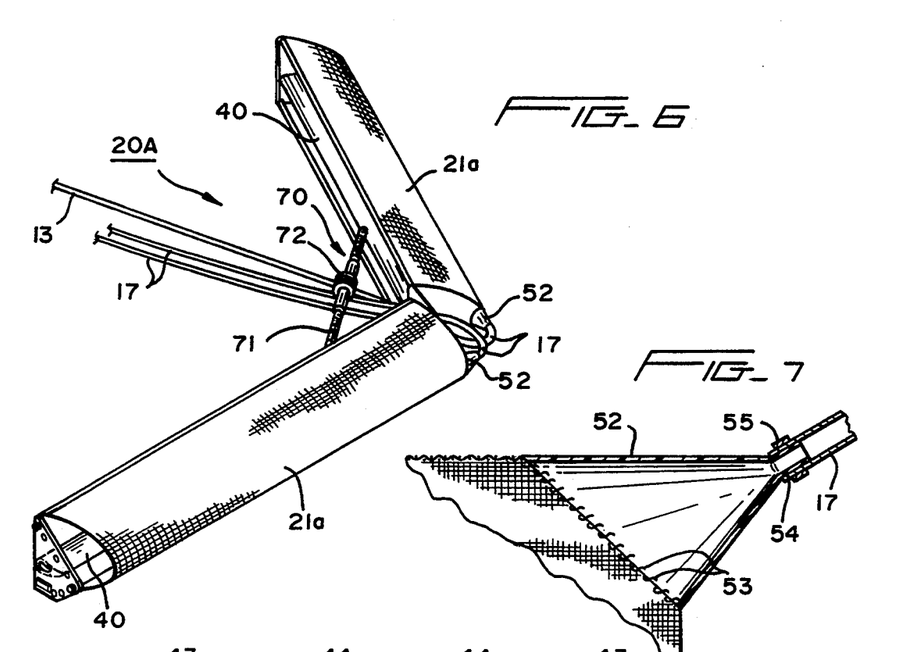
FIG. 6 is a perspective view of a trawl device composed of two trawl beams hingedly connected together and having suction pockets at the hinged ends.
FIG. 7 is a detail view, partly in cross-section, showing the suction pocket of a net defined by a portion of the net and an attached funnel.

The trawl beam 21 further includes a net 50 affixed to the rear thereof. The net 50 consists of a strip of mesh webbing of nylon, high density polyethylene, or other like material of a size suitable to retain the desired shrimp, and has a length approximately the length of the trawl beam. One edge of the net is attached to the upper rod 26, and another edge is attached to the rear rod 27. Thus connected, when the trawl beam is pulled through the water, the net assumes a concave configuration or trough shape. Because the net is only connected to the trawl beam along the top and rear rods 26 and 27, open spaces 51 exist between the ends of the net and the strut plates when the trawl beam is moving through the water. The open spaces 51 allow easy escapement of non-targeted species as well as any debris stirred up from the sea bottom or otherwise present in the water, escape thereof being assisted by the lateral current formed within the net as it is being towed through the water. The net 50 is provided at one end with a suction pocket defined by a portion of the net together with a funnel attached to the net. As best seen in FIG. 7, the funnel, designated in its entirety by the numeral 52, is preferably made of plastic and has its wide end secured to the webbing of the net by stitching it thereto with thread 53 of nylon, polypropylene, or other suitable material. The suction pocket is precisely located at the back of the trough of the net directly behind a strut plate and adjacent an open space 51 so that it lies directly in the path of all objects which are in contact with the back of the net and are moving laterally along the back of the net by current flow toward the open space 51 to thereby intercept such objects yet allow all other objects not in contact with the back of the net to escape through the open space 51. For the trawl device 20B under discussion, the suction pocket is located at the end of the net remote from the end of the trawl beam 21 which is to be hingedly connected to another trawl beam 21. The purpose of the funnel 52 is to orient shrimp and any fin fish bycatch before they enter the neck 54 of the funnel, so as to reduce blockage. The suction pocket defined by a portion of the net and attached funnel constitutes means for collecting shrimp or, more generically, means for collecting sea catch before it is swept out of the net.

As further shown in FIG. 7, a conduit 17' is attached at one of its ends to the neck 54 of the funnel 52 by a hose clamp 55 or other convenient fastening means. The conduit is led from the funnel through the passageway 41 of the hydrofoil beam 40 and from there to the onboard suction pump 16. A corresponding conduit extends from the funnel on the net of the other trawl beam 21 of the trawl device 20B. These two conduits can be kept separate all the way from the funnels to the pump or can be joined together with an appropriate fitting in the vicinity of the trawl beams, with only one conduit then leading to the pump. In either event, shrimp and any non-targeted species arriving at the suction pockets are first sucked into the funnels and then into the conduits through which they are transported to the trawler. Although not depicted in the drawings, a back-flushing system is provided to flush out the conduits should they become clogged.

To complete the trawl beam 21, skids 60 are attached to the strut plates 30, 30 on each side near the bottom edge 32 by bolts 61, as illustrated the most clearly in FIGS. 4 and 5. The bolts 61 pass through elongated slots 62 in the strut plates, thus enabling the height of the skids relative to the bottom edge 32 of each strut plate to be readily adjusted. In use of the trawl beam, the bottom rod is in contact with the seabed, and that rod together with assistance from the skids 60 keeps the trawl beam from penetrating too deeply into soft areas of the seabed.

The rods 25, 26 and 27 have been illustrated as being in the nature of threaded bolts, that is, with nuts at both ends. This is the preferred construction, but rods which are welded to the strut plates 30, 30 could be used if desired.

As mentioned above, it is preferred to employ rods formed as long bolts. The reason for this preference is that the rods then can be readily unfastened to permit slight alterations of the heights of the longitudinal openings of the trawl beam. For example, on some occasions it may be desirable to attach strut plate extensions to the strut plates in order to increase the vertical gap leading into the net above the hydrofoil beam. This variation is illustrated schematically in FIG. 4 by the strut plate extension 30' shown in dashed lines. To attach strut plate extensions, the nuts on the ends of rods 26 and 27 are removed so that openings in the strut plate extensions can receive the rod ends, the strut plate extensions are bolted onto the outer sides of the strut plates using holes 23 provided for this purpose, and the nuts of the rods 26 and 27 are reinstalled. Another rod 28 is added at the tops of the strut plate extensions. The net 50 is then attached to rods 27 and 28, thereby increasing the height of the opening above hydrofoil beam 40.

As further shown in FIG. 4, an additional hole 29 is positioned along the leading edge 31 of the strut plate 30 and additional holes 29' are located along rear edge 34 of the strut plate 30. These additional holes 29, 29' permit the mouth openings of the net to be varied. In this respect, the bottom rod 25 can be raised by moving it to hole 29, or rod 27 can be lowered to any one of the locations of holes 29'. These alterations permit the trawl device to be fine tuned to maximize shrimp capture and to minimize the entry into the net of bycatch and unwanted objects lying on the seabed.

Preferably, the strut plates 30 and strut plate extensions 30' are formed of aluminum and the rods 25-28 are formed of stainless steel. However, these materials are not critical.

The trawl device 20A shown at the left in FIG. 1 is shown in greater detail in FIG. 6. The trawl device 20A differs from the trawl device 20B only in the manner in which the trawl beams are oriented, in the location of the suction pockets of the nets, in the position of the spreader mechanism 70, and in the angle of the strut plates 30 relative to the hydrofoil beam 40. More specifically, whereas the two trawl beams 21, 21 of the trawl device 20B are joined together at an angle of greater than 180 degrees as viewed from the trawler, the two trawl beams 21a, 21a of trawl device 20A are joined together at an angle less than 180 degrees as viewed from the trawler. Also, in the trawl device 20B, the suction pockets of the nets are located at the ends of the trawl beams 21, 21 which are remote from the joined ends; whereas in the trawl device 20A, the suction pockets of the nets are located at the ends of the trawl beams 21a, 21a where they are joined together. Further, in the trawl device 20B, the turnbuckle 71 of the spreader mechanism 70 is connected to the trailing edges of the hydrofoil beams 40 (note FIG. 2) and is thus placed under compression when the trawl device 20B is moving through the water. Conversely, in the trawl device 20A, the turnbuckle 71 of the spreader mechanism 70 is connected to the leading edges of the hydrofoil beams 40 (observe FIG. 6) and is thus in tension when the trawl device 20A is moving through the water. Lastly, with reference to the overall system as portrayed in FIG. 1 as well as to the individual trawl beam shown in FIG. 3, it will be noticed that the strut plates 30, 30 are disposed at angles other than 90 degrees with respect to the hydrofoil beam 40 so that when the trawl devices 20A and 20B are towed through the water, the lateral surfaces of the strut plates 30, 30 are substantially parallel to the tow direction. As a result, drag is reduced compared to the drag which would exist if the strut plates were arranged with a substantial lateral surface area presented to the direction of tow. As can be realized from the showing in FIG. 1, these angles of the strut plates relative to the hydrofoil beam are substantially different in style 20A from those of style 20B.

Figure 9:
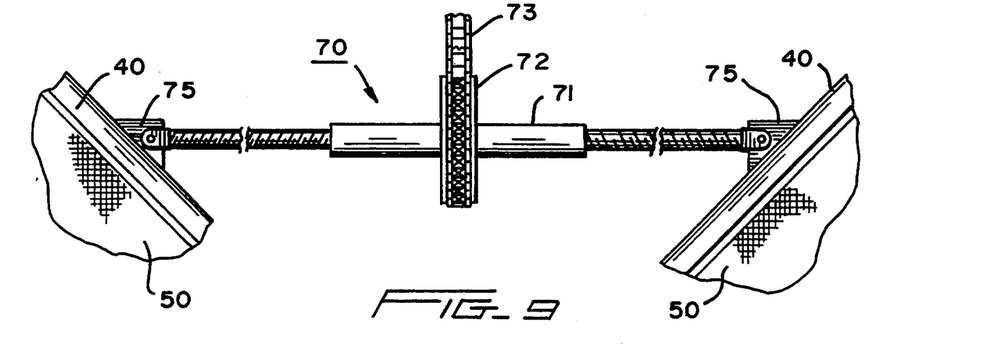
FIG. 9 is a detail view of a spreader mechanism composed of a turnbuckle and chain wheel.

FIG. 9 illustrates in greater detail the spreader mechanism 70 composed of turnbuckle 71 and chain wheel 72. This view shows the spreader mechanism connected between trawl beams of the type of trawl device shown in FIG. 6. As can be seen, the turnbuckle ends are fastened to attachment pieces 75, 75 rigidly affixed to the leading edges of the hydrofoil beams 40. A chain 73 passing around the chain wheel 72 extends to the trawler deck when the trawl device is suspended above the trawler wherefrom it can be manipulated to change the spread angle between the trawl beams 21a, 21a. A chain guard, not shown in the drawings, keeps the chain 73 from coming off the chain wheel 72. For onboard storage of the trawl devices, the two trawl beams of each trawl device 20A and 20B are brought together by manipulating the spreader mechanism 70 with the chain 73.

In configuration 20A, where the turnbuckle of the spreader mechanism is in tension during towing, the turnbuckle may be replaced by simpler mechanical devices such as three chains of adjustable length attached to the hinge piece 22 and to the two attachment pieces 75, 75. The tow cable 13 would then be attached to a connecting ring of the chains.

With reference once again to the overall system, the suction pump employed can be any of several well-known types which is capable of handling both live shrimp and non-targeted species with minimum damage. Two common types which are suitable are an open impeller centrifugal pump and a peristaltic pump. A conventional air lift system is also suitable. The conduits or hoses extending from the pump to the suction pockets of the nets are formed of non-collapsible polyvinyl chloride or neoprene rubber.

Having described the features of the overall trawling system 10 as well as the details of the various individual components thereof, the specific preferred manner of use and operation is now set forth.

While not fishing, the outriggers 12 and 12' of the trawler 11 are in raised positions and two trawl devices 20A or 20B are suspended therefrom in substantially upright and folded positions by the cables 13 and 13' which are attached to the towing eyes of the hinge pieces 22 of the two trawl devices. The conduits 17 and 17', which are affixed at one end to the necks 54 of the funnels 52 of the suction pockets and extend therefrom, have their remaining lengths coiled on the deck of the trawler or on hose reels aboard the trawler. Of course, the crew must take precaution to secure the suspended trawl devices from excessive movement during periods of navigation. Upon arrival at the selected fishing ground, the two trawl devices 20A or 20B are released from their secured positions, the spread angle of each is adjusted by manipulating the chain 73, and the two trawl devices are placed into the water by lowering the outriggers 12 and 12' to a substantially horizontal position. The trawler 11 is then put into forward motion and the cables 13 and 13' are allowed to pay out until the desired length has been reached. Conduits 17 and 17' will be pulled out during this process until the brakes of the winches 14 and 14' are put on. At that point, one of the separable couplings of each conduit 17 and 17' which are built into the conduits 17 and 17' at regular intervals will be released, thereby freeing the deployed length of conduit from the rest of the coiled conduit. The deployed lengths of conduit are then coupled to pump 16, the pump is activated, and fishing begins. At the end of the fishing period, the steps just described above are reversed to place the equipment back into its storage state.

As the trawl devices are pulled through the water, the depressor hydrofoil beams force the trawl devices downwardly until the bottom rods 25 come into contact with the seabed, the skids 60 limiting the depth to which the trawl beams penetrate into the seabed. As the bottom rods move along the seabed, shrimp are disturbed and tend to jump up. The low pressure zones formed beneath the hydrofoil beams cause the shrimp to be sucked upwardly through the spaces between the bottom rods 25 and the rear rods 27 to the areas of the nets 50. Due to the angular disposition of the nets relative to the tow direction, the flow of water moves the shrimp to the backs of the nets and then laterally in the directions of the suction pockets whereat the shrimp are sucked into the conduits and transported thereby to the trawler. In addition, shrimp which are swimming in the water will enter into the spaces between each bottom rod 25 and each hydrofoil beam 40 and between each upper rod 26 or 28 and each hydrofoil beam. Once again, since the nets are angled with respect to the tow direction, these shrimp also will be swept by the water to the backs of the nets and then moved toward the suction pockets and drawn into the funnels by the suction created by the pump. Heavier unwanted objects such as seashells and man-made debris lying on the sea bottom will pass under hydrofoil beams 40 and rear rods 27, which are expressly raised off the sea bottom at an adjustable height by virtue of the obtuse angle corner 38 formed between the bottom edge 32 and the rear edge 34 of each strut plate 30. This arrangement significantly reduces the amount of unwanted material entering the nets 50 and tending to block the suction conduits.

Of course, any non-targeted species located in the water will also enter into the spaces above and below each hydrofoil beam. However, the majority of non-targeted species, being fin fish and thus far better swimmers than shrimp, will be able to swim for a short while just ahead of the nets and will escape through the openings 51 existing between the nets and the strut plates, the strong currents flowing at an angle to the nets assisting their escape. Any non-targeted species that fail to escape will be drawn into the conduits along with the shrimp and conveyed to the trawler where they can be separated immediately from the shrimp and returned unharmed to the water. Turtles will also escape through open spaces 51 where they will be swept out by the current.

In those instances when only a single trawl device is utilized, ordinarily it will be towed centrally behind the trawler instead of to the side. The mode of operation and use is otherwise the same.

As can be appreciated from the above description and explanation, only shrimp and species of fin fish that are such weak swimmers that they cannot break contact with the nets and are small enough to enter the suction conduits will be suctioned aboard the trawler. Also, only solid objects which are small enough to enter the suction conduits will arrive onboard. All the rest will be swept out of the nets through the open spaces 51 by the strong currents flowing at an angle to the nets.

If blockage of a suction conduit should occur, the trawler crew will reverse the flow in the conduit to blow out the obstructive material through funnel 52 and out of the net through the open space 51.

The continuous delivery of shrimp to the trawler enables the crew to assess continually the quantity of shrimp in the area and to process the shrimp more effectively. In this last respect, shrimp can be placed immediately into tanks with circulating sea water, thus reducing labor requirements of storing the shrimp with or without heads in ice or in frozen form. This permits the delivery of live shrimp if desired.

From the foregoing description, it is apparent that the invention fulfills all of the objects listed above and overcomes the numerous drawbacks and deficiencies currently existing in the prior art.

While the invention necessarily has been described in specific terms so as to enable one skilled in the art to make and use the same, it is to be understood that such terms are not to be construed as limiting the invention to the precise construction described. Rather, the invention is limited only by the terms of the appended claims.

I claim:

1. A trawl beam for a shrimp trawl device, comprising: a support frame including a depressor hydrofoil beam; a net for catching shrimp secured to said support frame, said net forming a trough and extending along the length of said support frame; an open space between said net and said support frame adjacent an end of said support frame for allowing bycatch to escape; and shrimp collecting means adjacent to said open space.

2. The trawl beam for a shrimp trawl device in accordance with claim 1 and further comprising means for scaring up shrimp from the seabed.

3. The trawl beam for a shrimp trawl device in accordance with claim 1 wherein said depressor hydrofoil beam comprises an elongated beam member having inverted hydrofoil surfaces constituted by an upper concave surface and a lower convex surface.

4. The trawl beam for a shrimp trawl device in accordance with claim 1 wherein said depressor hydrofoil beam has a passageway extending therethrough from end to end.

5. The trawl beam for a shrimp trawl device in accordance with claim 1 wherein said shrimp collecting means comprises a suction pocket.

6. A trawl beam for a shrimp trawl devices, comprising: a depressor hydrofoil beam; at least a pair of vertically oriented, opposed, end strut plates held in spaced-apart relationship by said depressor hydrofoil beam, each strut plate having a vertical leading edge; a rod extending between said strut plates below said depressor hydrofoil beam at said leading edges, said rod constituting means for scaring up shrimp from the seabed; a net for catching shrimp, said net having a suction pocket for receiving shrimp; and an open space near said suction pocket for allowing bycatch to escape.

7. A trawl beam for a shrimp trawl device, comprising: a depressor hydrofoil beam; at least a pair of vertically oriented, opposed, end strut plates spanned by upper and lower leading rods and a trailing rod, said depressor hydrofoil beam extending between said strut plates at a location intermediate said upper and lower leading rods such that open spaces for shrimp to pass through exist between said upper leading rod and said depressor hydrofoil beam and between said lower leading rod and said depressor hydrofoil beam, said depressor hydrofoil beam having ends rigidly connected to said strut plates; a net for catching shrimp, said net having a suction pocket for receiving shrimp; and an open space near said suction pocket for allowing bycatch to escape.

8. The trawl beam for a shrimp trawl device in accordance with claim 7 wherein said net has an edge attached to said upper leading rod along substantially the entire length of said upper leading rod, and said net has an edge attached to said trailing rod along substantially the entire length of said trailing rod.

9. The trawl beam for a shrimp trawl device in accordance with claim 8 wherein an open space exists between said lower leading rod and said trailing rod through which shrimp are sucked up into said suction pocket when scared up from the seabed by said lower leading rod.

10. The trawl beam for a shrimp trawl device in accordance with claim 8 wherein said suction pocket is positioned directly behind one of the strut plates.

11. The trawl beam for a shrimp trawl device in accordance with claim 7 wherein each strut plate has a strut plate extension attached thereto, each strut plate extension having a portion extending above said upper leading rod, and a further rod extending between said strut plate extensions above said upper leading rod.

12. The trawl beam for a shrimp trawl device in accordance with claim 11 wherein said net has an edge attached to said further rod along substantially the entire length of said further rod, and said net has an edge attached to said trailing rod along substantially the entire length of said trailing rod.

13. The trawl beam for a shrimp trawl device in accordance with claim 7 wherein each strut plate includes skids for sliding along the seabed and for preventing the entire trawl beam from penetrating too deeply into soft areas of the seabed as the trawl beam is being towed through the water.

14. A shrimp trawl device comprising:
two elongated trawl beams
each trawl beam comprising a rigid frame structure defined by at least a pair of vertically oriented, opposed, end strut plates spanned by upper and lower leading rods and a trailing rod;
each trawl beam further including a depressor hydrofoil beam extending between said strut plates at a location intermediate said upper and lower leading rods and being rigidly fastened to said strut plates, a net secured to said upper leading rod and to said trailing rod along substantially the entire lengths thereof, shrimp collecting means located adjacent to one said end strut plates, and an open space adjacent to said shrimp collecting means for allowing escape of non-targeted species; and said two trawl beams being positioned so that ends thereof are adjacent and being hingedly connected together at the adjacent ends.

15. The shrimp trawl device in accordance with claim 14 wherein said shrimp collecting means of each trawl beam comprises a funnel having its wide end secured to the net.

16. The shrimp trawl device in accordance with claim 14 and further including a spreader means connected between said trawl beams near the ends thereof which are hingedly connected together for maintaining said trawl beams at an angle with respect to each other and for enabling the angle between said trawl beams to be varied.

17. The shrimp trawl device in accordance with claim 16 wherein said spreader means comprises a turnbuckle including a chain wheel.

18. The shrimp trawl device in accordance with claim 14 wherein said shrimp collecting means of said two trawl beams are located at the ends of said two trawl beams which are hingedly connected together and wherein said open spaces for allowing escape of non-targeted species also are located at the ends of said two trawl beams which are hinged together.

19. The shrimp trawl device in accordance with claim 14 wherein said shrimp collecting means of said two trawl beams are located at the ends of said two trawl beams which are remote from the ends of said two trawl beams which are hingedly connected together, and wherein said open spaces for allowing escape of non-targeted species also are located at the ends of said two trawl beams which are remote from the ends of said two trawl beams which are hingedly connected together.

20. A shrimp trawl device, comprising:
a first elongated trawl beam;
said first elongated trawl beam including at least a pair of vertically oriented end strut plates, an elongated depressor hydrofoil beam having inverted hydrofoil surfaces interconnecting said strut plates, a first rod spanning said strut plates above said depressor hydrofoil beam, a second rod spanning said strut plates below said depressor hydrofoil beam, said first and second rods, said depressor hydrofoil beam, and said strut plates forming entrance spaces for shrimp to pass through, a net enclosing the area opposite said entrance spaces to receive and catch shrimp, and a shrimp collector funnel attached to said net, said funnel being attachable to a source of suction;
a second elongated trawl beam;
said second elongated trawl beam including at least a pair of vertically oriented end strut plates, an elongated depressor hydrofoil beam having inverted hydrofoil surfaces interconnecting said strut plates, a first rod spanning said strut plates above said depressor hydrofoil beam, a second rod spanning said strut plates below said depressor hydrofoil beam, said first and second rods, said depressor hydrofoil beam, and said strut plates forming entrance spaces for shrimp to pass through, a net enclosing the area opposite said entrance spaces to receive and catch shrimp, and a shrimp collector funnel attached to said net, said funnel being attachable to a source of suction; and said first and second elongated trawl beams having ends hingedly connected together so that said first and second elongated trawl beams can be angularly adjusted relative to each other.

21. The shrimp trawl device in accordance with claim 20 and further including a spreader means connected between said first and second elongated trawl beams for maintaining said first and second elongated trawl beams at an angle with respect to each other and for enabling the angle to be varied.

22. The shrimp trawl device in accordance with claim 21 wherein said spreader means comprises a turnbuckle including a chain wheel.

23. The shrimp trawl device in accordance with claim 20 wherein said shrimp collector funnels attached to said nets of said first and second elongated trawl beams are located at the ends of said first and second elongated trawl beams which are hingedly connected together.

24. The shrimp trawl device in accordance with claim 23 wherein each of said first and second elongated trawl beams includes an open space between the net and the strut plate at the hingedly connected end for allowing escape of non-targeted species.

25. The shrimp trawl device in accordance with claim 20 wherein said shrimp collector funnels attached to said nets of said first and second elongated trawl beams are located at the ends of said first and second elongated trawl beams which are remote from the ends which are hingedly connected together.

26. The shrimp trawl device in accordance with claim 25 wherein each of said first and second elongated trawl beams includes an open space between the net and the strut plate remote from the hingedly connected end for allowing escape of non-targeted species.

27. A trawling system for shrimp, comprising:
a trawler;
a suction pump onboard said trawler;
at least one trawl device;
said at least one trawl device comprising two trawl beams hingedly connected together at adjacent ends and forming an angle therebetween;
a tow line extending from said trawler to the location whereat said two trawl beams are hingedly connected together;
each trawl beam including a depressor hydrofoil beam and a net for catching shrimp;
each net including a suction pocket for receiving shrimp;
a conduit connected to each suction pocket and extending therefrom to said onboard suction pump for transporting shrimp to said trawler; and
each trawl beam having an open space near the suction pocket of the net thereof for allowing bycatch to escape.

28. The trawling system for shrimp in accordance with claim 27 wherein each trawl beam includes means for scaring up shrimp from the seabed.

29. The trawling system for shrimp in accordance with claim 27 wherein each suction pocket includes a funnel having its wide end secured to the net.

30. The trawling system for shrimp in accordance with claim 27 wherein each depressor hydrofoil beam has a passageway extending therethrough from end to end, and wherein each conduit extending from a suction pocket extends through a respective said passageway.

31. The trawling system for shrimp in accordance with claim 27 wherein the angle formed between said two hingedly connected together trawl beams is less than 180 degrees as viewed from said trawler.

32. The trawling system for shrimp in accordance with claim 31 wherein said suction pockets and said open spaces for allowing bycatch to escape are located at the ends of said two trawl beams which are hingedly connected together.

33. The trawling system for shrimp in accordance with claim 27 wherein the angle formed between said two hingedly connected together trawl beams is greater than 180 degrees as viewed from said trawler.

34. The trawling system for shrimp in accordance with claim 33 wherein said suction pockets and said open spaces for allowing bycatch to escape are located at the ends of said two trawl beams which are remote from the ends which are hingedly connected together.

35. The trawling system for shrimp in accordance with claim 27 wherein said trawler includes an outrigger at each side thereof, and wherein a trawl device is towed behind said trawler from each outrigger, each trawl device comprising two hingedly connected together trawl beams with each trawl beam including a depressor hydrofoil beam, a net for catching shrimp, a suction pocket for receiving shrimp, and an open space near the suction pocket for allowing bycatch to escape.

36. The trawling system for shrimp in accordance with claim 27 wherein a spreader mechanism connects said two trawl beams together near their hingedly connected together ends, said spreader mechanism comprising a turnbuckle and chain wheel whereby the angle between said two trawl beams can be varied.

37. The trawling system for shrimp in accordance with claim 27 and further including means for reversing the flow in the conduits to clear obstructions therein.

38. A trawl beam for a shrimp trawl device, comprising: an elongated depressor hydrofoil beam;
a first net attachment means extending along the length of said depressor hydrofoil beam, said first net attachment means being located above said depressor hydrofoil beam and spaced therefrom;
a second net attachment means extending along the length of said depressor hydrofoil beam, said second net attachment means being located behind said depressor hydrofoil beam and spaced therefrom;
a net composed of a strip of webbing having a length approximately the length of said depressor hydrofoil beam and having a top edge, a bottom edge and side edges, said top edge being attached to said first net attachment means, said bottom edge being attached to said second net attachment means, and said side edges being free of attachment, whereby said net assumes a concave trough shape when pulled through water;
an open space at a side edge of said net for allowing bycatch to escape; and
shrimp collecting means adjacent to said open space.

39. The trawl beam for a shrimp trawl device in accordance with claim 38 wherein said shrimp collecting means comprises a suction pocket.

40. The trawl beam for a shrimp trawl device in accordance with claim 38 wherein said elongated depressor hydrofoil beam comprises an elongated beam member having inverted hydrofoil surfaces constituted by an upper concave surface and a lower convex surface.

* * * * *